United States Patent Office 2,947,726
Patented Aug. 2, 1960

2,947,726

EPOXIDE RESINS

William J. Belanger, Louisville, Ky., assignor to Devoe & Raynolds Company, Inc., Louisville, Ky., a corporation of New York No Drawing. Filed May 2, 1957, Ser. No. 656,490

12 Claims. (Cl. 260—47)

This invention relates to the production of high molecular weight epoxide resins, and includes the new products and the method of producing them.

The new epoxide resins are produced by reacting cyanuric acid with an excess of a diepoxide sufficient to react with all of the acid groups of the cyanuric acid and to give a reaction product containing three or more epoxide groups per molecule, followed by further reaction of the resulting polyepoxide with a limited amount of a monofunctional reactant to give an epoxide resin with a smaller average number of epoxide groups such as a diepoxide.

The diepoxides used include aliphatic diepoxides and aromatic diepoxides such as the diglycidyl ethers of dihydric alcohols and dihydric phenols. Aliphatic diepoxides such as those described in Patent No. 2,581,464 or other aliphatic diepoxides can be used. A particularly valuable kind of diepoxides are the liquid or low melting point epoxide resins produced by the reaction of dihydric phenols and epichlorhydrin in the presence of caustic alkali. These resins may be essentially monomeric in character, such as a diglycidyl ether of a dihydric phenol, or they may be somewhat polymeric in character, and the average epoxide content of the resin may be somewhat less than that corresponding to a diepoxide.

These low melting diepoxides or epoxide resins include liquid and low melting diglycidyl ethers of dihydric phenols, and low melting resins having a weight per epoxide of less than about 1000. In referring to these resins as diepoxides, the amount of resin required to furnish two epoxide groups is used, and somewhat more than one mol of resin may be required to give this diepoxide equivalent.

The monofunctional reactants used for reaction with the polyepoxides to decrease and regulate their functionality include monofunctional reactants such as monohydric phenols, monobasic acids and monohydric alcohols.

Cyanuric acid is trifunctional and has three acid groups which can react with an epoxide group of the diepoxide. Three moles of a diepoxide can react with one mol of cyanuric acid through one of their epoxide groups to give a product which is essentially a triepoxide. The production of such high molecular weight polyepoxides is described in the Cooke application Serial No. 656,488.

According to the present invention, the production of such polyepoxides is modified by including, as a part of and as a second step of the process, the addition of a monofunctional reactant to react with a limited portion of the epoxide groups of the polyepoxide to produce an epoxide resin of lower functionality, such as a diepoxide.

In carrying out the process, a limited amount of cyanuric acid is used with a sufficiently large excess of diepoxide to react with all of the acid groups of the cyanuric acid and to produce a polyepoxide containing three or more epoxide groups; and there is added to the reaction mixture or solution in which the polyepoxide is formed a limited amount of the monofunctional reactant with further reaction to reduce the epoxide groups of the polyepoxide to give a product of lower functionality from the standpoint of the number of epoxide groups and particularly to produce a product such as a diepoxide.

When one mole of cyanuric acid is reacted with three moles of a diepoxide, the product is essentially or approximately a triepoxide or is largely a triepoxide. With somewhat less than three moles of diepoxide to one of cyanuric acid, e.g. with 5 moles of diepoxide to 2 moles of cyanuric acid, a polymeric product is produced which is primarily a tetraepoxide, or is largely a tetraepoxide. When these polyepoxides are reacted with a limited amount of monofunctional reactant, a triepoxide is converted e.g. to a diepoxide if one mole of monofunctional reactant reacts with one mole of triepoxide. Similarly, a tetraepoxide can be reacted with one mole of monofunctional reactant to form a triepoxide or with two moles to form a diepoxide.

The process is advantageously carried out in the presence of an organic solvent. Cyanuric acid is not soluble to any considerable extent in most organic solvents but it gradually dissolves and reacts. When all of the cyanuric acid in suspension is dissolved it has apparently all reacted with the diepoxide. At this stage of the process and before the reaction is continued to produce a more complex reaction product, there is added to the solution a small and regulated amount of the monofunctional reactant and the process is continued to react this reactant with the polyepoxide to reduce its epoxide content to the desired extent.

Although the process is advantageously carried out as two stages of a single operation carried out in the same reaction vessel and with the addition of the monofunctional reactant after the first reaction has taken place, the process can be carried out in two different and successive operations, in which the polyepoxide produced by the first stage of the process can be isolated and reacted with a monofunctional reactant as a separate and subsequent operation, either without the presence of a solvent or with the presence of a solvent for the reactants and for the final reaction product.

The reaction between the cyanuric acid and the diepoxide, and the further reaction between the polyepoxide and the monofunctional reactant, are advantageously carried out with the use of a catalyst, and particularly with a suitable organic base as a catalyst, such as tertiary amines, e.g., tripropyl amine and dimethyl aniline; quaternary ammonium hydroxides such as benzyl trimethyl ammonium hydroxide; quaternary ammonium salts such as benzyl trimethyl ammonium chloride; and quaternary ammonium ion-exchange resins. Quaternary ammonium salts such as benzyl trimethyl ammonium chloride are particularly advantageous.

The products will vary in their epoxide equivalents. The epoxide equivalent is the equivalent weight of the product per epoxide group. The method used for determining the epoxide content comprises heating 1 gram sample of the product with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that 1 HCl is equivalent to 1 epoxide group.

The invention will be further illustrated by the following examples, but it will be understood that the invention is not limited thereto. In the examples, the parts are by weight. The melting points and epoxide values are those of the solvent-free resin.

Example 1

The diepoxide used in this example was prepared as follows:

In a reaction vessel equipped with an agitator, thermometer and condenser, about 1 mol of bisphenol is dissolved in 10 mols of epichlorhydrin and 1 to 2 percent water is added to the resulting mixture. The mixture is then brought to 80° C. and 2 mols of sodium hydroxide are added in small portions over a period of about 1 hour. During the addition the temperature of the mixture is held at about 90° C. to 110° C. After the sodium hydroxide has been added, the water formed in the reaction and most of the epichlorhydrin is distilled off. The residue is combined with an approximately equal amount of benzene and the mixture filtered to remove the salt. The benzene is then removed to yield a viscous liquid having a weight per epoxide of 185.

This diepoxide was reacted with cyanuric acid and with 2-ethyl hexoic acid as the monofunctional reactant as follows: In a vessel equipped with a reflux condenser, agitator and thermometer, there was charged 114 parts (0.3 mole) of the above resin, 12.9 parts (0.1 mole) cyanuric acid, and one part of a 60% aqueous solution of benzyl trimethyl ammonium chloride, together with 100 parts of dioxane. This mixture was refluxed with agitation for one hour to effect reaction between the cyanuric acid and the diepoxide, after which 14.4 parts of 2-ethyl hexoic acid were added and reflux was continued for 40 minutes. At this time the product had an acid value of less than 1.

The resulting resin had a weight per epoxide of 624 and approximated a diepoxide in composition.

The solution of the resin produced as above described had added thereto 4% of tetraethylene pentamine and a film was prepared and cured for 30 minutes at 150°. The film was well cured, possessed good color and resistance and good hardness, toughness and flexibility.

Example 2

A resin which was primarily or mainly a diepoxide was prepared by reacting one mol of cyanuric acid, 3 mols of the resin of Example 1 and one mol of nonylphenol as follows:

There was added to a reaction vessel such as described in Example 1, 114 parts (0.3 mole) of the same epoxide resin as in Example 1, 12.9 parts (0.1 mol) of cyanuric acid and 1 part of a 60% aqueous solution of benzyl trimethyl ammonium chloride, together with 100 parts of dioxane. This mixture was refluxed for one hour and there was then added 23.6 parts (0.1 mol) of nonyl phenol and refluxing was continued for an additional 2½ hours, after which the mixture was cooled to room temperature and diluted with dioxane to a 50% solids content. The viscosity of the solution was N. Samples of this solution were blended, respectively with 2, 3, 4 and 5% tetraethylene pentamine. Films were prepared from the resulting solutions and baked at 180° C. for 15 minutes. All the films were hard, tough, flexible and exhibited mar resistance.

The resin produced by the above example had a weight per epoxide of 698 and approximated a diepoxide.

Example 3

There was added to a reaction vessel such as described in Example 1, 190 parts (0.5 mol) of the same epoxy resin as in Example 1, 25.8 parts (0.2 mol) of cyanuric acid, 3 parts of a 60% aqueous solution benzyl trimethyl ammonium chloride and 200 parts of dioxane. This mixture was refluxed for one hour and there was then added 9.4 parts (0.1 mol) of phenol and 14.4 parts (0.1 mol) of 2-ethyl hexoic acid and refluxing was then continued for six hours after which the product was cooled to room temperature and diluted to 50% non-volatile material with dioxane.

The resin had a weight per epoxide of 1136, indicating a polymeric triepoxide. It had a viscosity of T to U and the acid value was 5.0.

The solution produced, as above described, was mixed in different samples, with 2, 3, 4 and 5%, respectively, of tetraethylene pentamine. Films were prepared from each solution and baked at 180° C. for 15 minutes. The films were hard, tough, flexible and exhibited good mar resistance.

Example 4

In an apparatus such as referred to in Example 1, there was added 57 parts (0.15 mol) of the same epoxy resin as in Example 1, 6.45 parts (0.05 mol) of cyanuric acid, one part of tribenzyl trimethyl ammonium chloride and 125 parts of dioxane. This mixture was refluxed for one hour and there was then added 28 parts (0.1 mol) of soya acids and refluxing was continued for 6 hours, after which the product was cooled to room temperature.

The resulting epoxy resin had a weight per epoxide of 1660, an acid value of 1.99, and a solution of 42% non-volatile content had a viscosity of A to B.

Example 5

In an apparatus such as referred to in Example 1, there was added 57 parts (0.15 mol) of the same epoxy resin as in Example 1, 6.45 parts (0.05 mol) of cyanuric acid, one part of tribenzyltrimethyl ammonium chloride, and 125 parts of dioxane. This mixture was refluxed for one hour, there was then added 9.4 parts (0.1 mol) of phenol, and refluxing was then continued for an additional 7 hours. The mixture was then cooled and reduced to 40% non-volatile with dioxane. Viscosity of the solution was A–B. The observed weight per epoxide was 1620, indicating a product essentially monoepoxide.

Example 6

The epoxy resin used was an epoxy resin produced by the reaction of the bisphenol and epichlorhydrin having a melting point of 80° C. and a weight per epoxide of 586. In an apparatus such as described in Example 1, there was added 175.8 parts (0.15 mol) of this resin, 6.45 parts (0.05 mol) of cyanuric acid, 3 parts of a 60% aqueous solution of benzyl trimethyl ammonium chloride, and 250 parts of dioxane.

This mixture was refluxed for 3 hours and then reduced to 40% non-volatile content with dioxane. To 142.6 parts of the 40% dioxane solution was added 3.2 parts of soya acid and the mixture was refluxed for 4 hours. The viscosity of the solution was Z–6.

The weight per epoxide of the resin produced was 3900, indicating that some polymerization had occurred during this reaction.

Other monofunctional reactants can be used in a similar manner to that indicated by the above examples. And other diepoxides can be used for reaction with cyanuric acid to form the polyepoxides which are then reacted with the monofunctional reactants.

The products produced by the present invention, if they are polyepoxides or contain substantial amounts of polyepoxides, can be used as epoxide resins in making coating compositions, adhesives, molding mixtures, etc. Products which are essentially monoepoxides can be used as plasticizers and for other purposes.

The present invention enables the functionality of epoxide resins to be regulated and controlled by the use of varying amounts of monofunctional reactants for reacting with the polyepoxides resulting from the reaction of cyanuric acid with diepoxides.

I claim:

1. The method of producing high molecular weight, soluble, fusible epoxide resins which comprises heating to a reaction temperature cyanuric acid with a sufficient excess of a diepoxide selected from a member of the group consisting of diglycidyl ethers of dihydric phenols and diglycidyl ethers of dihydric alcohols to react with all of the acid groups of the cyanuric acid to give a polyepoxide reaction product containing at least three epoxide groups, adding to the reaction mixture a monofunctional reactant selected from a member of the group consisting of a monohydric phenol, a monocarboxylic acid and a monohydric alcohol in limited amount and reacting the polyepoxide with the monofunctional reactant to give a soluble, fusible epoxide resin of lower epoxide content, said reaction being carried out in admixture with an organic base as a catalyst.

2. The method according to claim 1 in which the monofunctional reactant is a monohydric phenol.

3. The method according to claim 1 in which the monofunctional reactant is a monocarboxylic acid.

4. The method according to claim 1 in which the monofunctional reactant is a monohydric alcohol.

5. The method according to claim 1, in which the diepoxide is a diglycidyl ether of a dihydric phenol.

6. Epoxide resins produced by the process of claim 1.

7. Epoxide resins produced by the process of claim 2.

8. Epoxide resins produced by the process of claim 3.

9. Epoxide resins produced by the process of claim 4.

10. Epoxide resins produced by the process of claim 5.

11. The method of producing high molecular weight, soluble, fusible epoxide resins which comprises heating to a reaction temperature cyanuric acid with a sufficient excess of a diepoxide selected from a member of the group consisting of diglycidyl ethers of dihydric phenols and diglycidyl ethers of dihydric alcohols to react with all of the acid groups of the cyanuric acid to give a soluble, fusible polyepoxide reaction product containing at least three epoxide groups, adding to the reaction mixture a monofunctional reactant selected from a member of the group consisting of a monohydric phenol, monocarboxylic acid, and a monhydric alcohol in a limited amount, and reacting the polyepoxide with the monofunctional reactant to give a soluble, fusible epoxide resin of lower epoxide content, said reaction being carried out in admixture with an organic base as a catalyst.

12. Epoxide resins produced according to the process of claim 11.

References Cited in the file of this patent
FOREIGN PATENTS 133,819     Australia _____ Aug. 10, 1949